United States Patent [19]

Hostetler

[11] 4,392,229

[45] Jul. 5, 1983

[54] RING LASER WITH PLASMA STARTER

[75] Inventor: James W. Hostetler, Thousand Oaks, Calif.

[73] Assignee: Litton Systems, Inc., Beverly Hills, Calif.

[21] Appl. No.: 216,543

[22] Filed: Dec. 15, 1980

[51] Int. Cl.³ .............................................. H01S 3/08
[52] U.S. Cl. .................................... 372/94; 356/350; 372/87

[58] Field of Search ..................... 372/94, 93, 92, 107, 372/108, 87; 356/350

Primary Examiner—William L. Sikes
Assistant Examiner—Leon Scott, Jr.
Attorney, Agent, or Firm—Roy L. Brown

[57] ABSTRACT

A ring laser having at least one cathode and means for illuminating the cathode.

7 Claims, 4 Drawing Figures

RING LASER WITH PLASMA STARTER

BACKGROUND OF THE INVENTION

It is contemplated by this invention to provide a means for rapidly bringing a ring laser into operative condition, even at very low temperatures, in a minimum time after turn-on. Prior ring lasers, which used a cold cathode and at least one anode to supply an electric field and electrons to the laser gas discharge, required on the order of at least 300 milliseconds after the exciting voltage was applied between such cathode and anodes before the laser was ready to operate as an angular rate sensor. At times such discharge could not be obtained. It is contemplated by this invention to illuminate the cold cathode of the ring laser to reduce the start-up time, even at very low temperatures, to the order of three to eight milliseconds.

Although no prior art of illuminating ring laser cold cathodes is known to the inventor, radiation rays have been used in linear lasers for purposes other than accelerating the start-up of the laser.

Radiation rays have also been used in connection with arc and glow lamps and with tubes.

Examples of the background art known to the inventor follow.

U.S. Pat. No. 2,405,071, which pertains to a Pulse Generating System, shows in FIG. 1 an ultra violet source used to illuminate a spark gap in air. As recited in column 3, line 75 to column 4, line 7, the purpose of irradiating the spark gap is to enhance the accuracy of timing of the firing intervals of the spark.

U.S. Pat. No. 3,224,236, which pertains to a Noble Gas Flash Lamp and Laser Light Source, describes an explodable chemical light source characterized by high brilliancy, high color temperature, and special and specific spectral emission qualities. Such flash lamp sources have particular spectral characteristics to match those of a laser which is to be pumped. The high intensity flashing light is then used to pump the laser, raising the energy levels of the laser gas so that the gas lases.

U.S. Pat. No. 3,351,870, which pertains to a Pulsed Gas Laser, teaches a linear laser having a continuous operation. The laser gas is a mixture of helium and neon, and the gas is pumped by high voltage repetitive pulses each having fast rise time, short width and relatively long pulse repetition rate. Alternatively, it is recited that the laser may be energized by direct current or radio frequency energy. Column 12, line 68 through column 13, line 1 recites that although use of a cold cathode from which electrons are emitted by gamma processes and field emission were described, the electrons may be supplied by a hot cathode, or the electrons may be given off as a result of ultraviolet light impinging upon a cold cathode and producing photoelectric emission of electrons.

U.S. Pat. No. 3,657,600 pertains to Auxiliary Ionization of DC Electric Discharge Electrode Boundary Sheaths particularly in high power lasers such as nitrogen/carbon dioxide lasers. The invention uses auxiliary ionization of gas plasma in a column of anode-cathode ion and electron flow in the nitrogen/carbon dioxide. One of the auxiliary ionization sources, as recited in column 4, lines 66 through 71, is a source of intense photon flux oriented to inject flux adjacent to either or both of the main electrodes of the DC electric discharge. When the auxiliary ionization is employed in a gas laser, the photon flux should preferably be of a wavelength which does not interfere with laser operation.

U.S. Pat. No. 3,772,608, which pertains to Charged-Particle Discharge for a Laser, teaches the use of a radioactive source to produce charged particles which are injected throughout the discharge volume of a laser to create uniform ionization therein and thus trigger the electrical discharge needed to excite the laser medium. The beam of charged particles initiates a discharge by producing an initial ion and electron population within the discharge volume. The charged particle beam may be created by a radioactive source or by artificial sources such as electron guns, particle accelerators, or other devices which produce a directed flow of charged particles with sufficient energy to penetrate the active laser fluid over the entire discharge volume.

U.S. Pat. No. 3,934,212 pertains particularly to a high powered pulsed laser—for example, a carbon dioxide laser. The patent discloses a laser comprising a volume of gas having a lasing constituent, a light source arranged to emit light having ionizing photons for ionizing the gas, with the effective photon energy spectrum of the ionizing photons lying below the ionization potential of the lasing constitutent and below the level of photon absorption bands of the gas.

U.S. Pat. No. 4,004,250 pertains to Laser Action by Optically Depumping Lower States. The invention is directed to depopulating lower energy levels of a high powered laser, typically of the carbon dioxide type, by exposing the laser medium (carbon dioxide) to an intense source of radiation. The radiation must have particular wavelength characteristics to achieve the required depumping.

U.S. Pat. No. 4,016,448 pertains to a High Power Electric Discharge Method and Apparatus for Laser Chemical Synthesis and Other Applications. The type of an external ionization source 70 is not specified. It is mentioned only once in column 6, line 60. The plasma instability growth time is approximately $CP/JE$ where P is the gas pressure in Torr, JE is the electrical power density in watts/cubic centimeter and the constant C is increased in amplitude when the external ionization source is used. Thus the plasma instability growth time is increased by a factor of ten by using the external ionization source.

U.S. Pat. No. 4,064,465 pertains to Laser Cavities with Gas flow through the electrodes. The apparatus is particularly directed toward a high pressure pulsed gas laser wherein the laser gas is flowing at high pressure through an electrode assembly. Discharge initiation is achieved using, for example, ultraviolet irradiation of the electrode assembly. U.S. Pat. No. 4,077,017 pertains to an Ultraviolet Radiation Induced Discharge laser. The laser is a high pressure gas pulsed laser, such as a transverse electric atmosphere laser, to achieve free electron production in the gas by photoelectric interaction between ultraviolet radiation and a cathode prior to the gas-exciting cathode-to-anode electrical discharge, thereby producing volume ionization of the gas.

BRIEF DESCRIPTION OF THE INVENTION

The apparatus contemplated by this invention is a ring laser which is particularly adapted for use as an angular rate sensor. The ring laser typically has a closed laser path in a resonant cavity whose length is adjustable to tune it. Such a ring laser cavity usually has the shape of a polygon: for example, a planar triangle or rectangle. It may, however, be of any polygonal shape, and it need not be planar. At each of the vertices of the polygonal cavity is a mirror positioned at an appropriate angle to direct the laser radiation along the laser path.

In a typical ring laser there may be one or more cathodes and one or more anodes so that voltages applied between the anodes and cathodes provide energy to the gain regions of the ring laser in a symmetrical manner to produce two cancelling and opposing electric field paths in the gain regions of the plasma discharge.

When the voltage is removed from the cathodes and anodes for a period of time sufficiently long to allow the gas to fully deionize and the surface electrons on the cathode to deplete, but insufficiently long enough to allow the gas, glass envelope and cathode(s) to cool completely to its surrounding environment nor to allow the total depletion of the stored charge in the glassy dielectric medium, it can typically take from 50 to 400 milliseconds of applied voltage before the ring laser is operating again in a satisfactory manner for angular rate sensing.

It is contemplated by this invention that a small light, such as a flashlight or panel light, shall be energized for a very brief period at start-up of the ring laser when voltage is simultaneously applied between the anodes and cathodes, and its illumination shall be directed onto the cathode surface. Photoemission from the cathode occurs, and the starting time of the ring laser is reduced, even in a very cold environment, to the order of three to eight milliseconds.

It is therefore an object of this invention to provide a ring laser suitable for use in an angular rate sensor with a start-up time on the order of three to eight milliseconds.

It is a more specific object of this invention to provide a ring laser adapted to be energized by gas ion flow and electron flow between at least one cathode and preferably two anodes which counterpropagate such ions and electrons through two gain regions within the resonant cavity of the ring laser, and wherein the cathode or cathodes are illuminated at least by a start-up pulse of illumination from a radiation source.

BRIEF DESCRIPTION OF THE DRAWINGS

Other objects will become apparent from the following description, taken in connection with the accompanying drawings, in which.

DETAILED DESCRIPTION OF THE INVENTION

The apparatus of this invention is a fast-starting ring laser which is particularly useful as an angular rate sensor.

Figure 1:
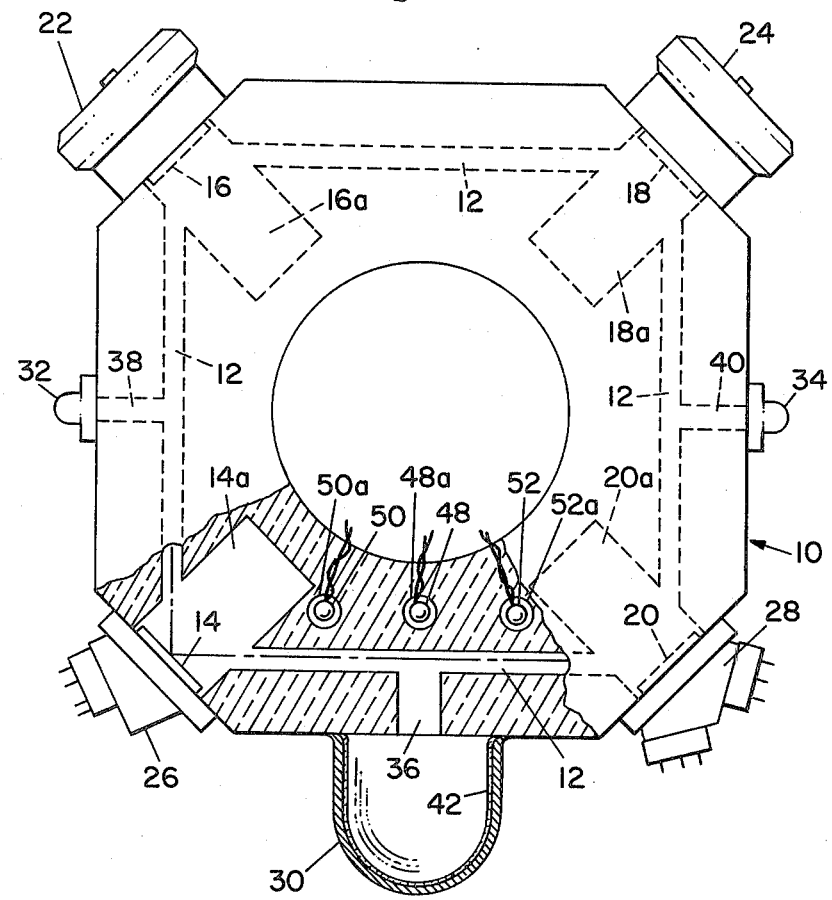
FIG. 1 is a plan view, partly in section, of a ring laser showing an illumination source illuminating a cathode of the laser.
Figure 2:
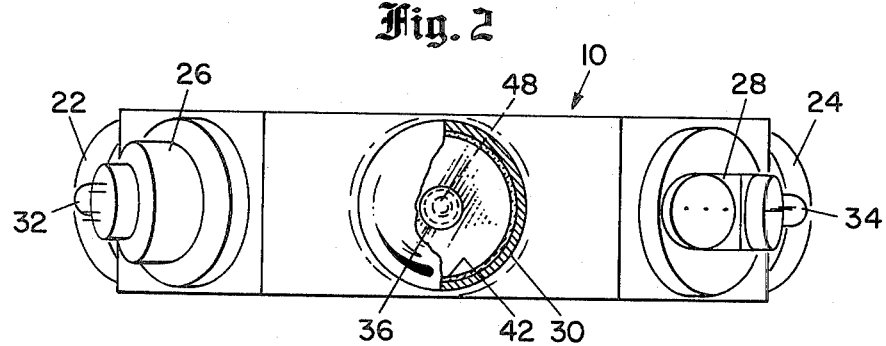
FIG. 2 is a view, partly in section, taken from the bottom in FIG. 1.

The ring laser is shown in plan view in FIG. 1 and, in a view taken from the bottom of FIG. 1, in FIG. 2. A ring laser block 10, which is made of a dimensionally stable material such as quartz, is shown generally rectangularly shaped to carry a rectangularly shaped ring laser cavity 12. The cavity 12 is filled with a laser gas such as, for example, a mixture of helium and isotopes of neon. It should be noted that the ring laser cavity 12 need not be rectangular. The cavity 12 is usually polygonal and frequently triangular. The laser cavity 12 is shown as a planar cavity, but the cavity need not be planar. Mirrors 14, 16, 18, and 20 are positioned at the vertices of the rectangular cavity 12 to create a resonant ring laser cavity, and the housing 10 has bores 14a, 16a, 18a, and 20a to receive the mirrors 14, 16, 18 and 20. The bores are filled with the laser gas. The mirrors are angled to reflect counterpropagating laser light around the cavity 12. The inward and outward positions of mirrors 16 and 20 are adjustable by transducers, such as crystal transducers, within housings 22, 24. Mirrors 14 and 20 may be partly transmissive so that photosensors within housings 26, 28 may sense the counterpropagating laser light. The sensed signals may then be used to servo one or more of the mirrors 16, 18 to resonate the cavity, and the sensed signals are used to produce another signal which is a beat signal between the signals produced by the counterpropagating laser light beams.

To produce lasing in the ring laser, a cathode 30 and anodes 32, 34 are hermetically sealed to the block 10, and passageways 36, 38, and 40 connect the interior surfaces of cathode 30 and anodes 32, 34 to the gas in the ring laser cavity 12. The anodes 32, 34 and the cathode 30 are metallic (usually aluminum), and the interior of the cathode 30 is preferably covered with a coating 42 of an emitting oxide (usually aluminum oxide). In a preferred embodiment, the cathode 30 is dome-shaped.

In operation, a voltage from voltage source 44 (See FIG. 3) is connected, through a starting switch 46, by its positive terminal to the anodes 32, 34 and by its negative terminal to the cathode 30. Usually, under room temperature conditions, one can expect that a flow of ions and electrons is initiated, and the ring laser becomes operative in about 50 to 800 milliseconds.

At very low temperatures, such as the extreme temperatures to be found in stellar space or the temperatures to be found in the earth's frigid zones, the laser gas is not as easily ionized, and very high voltage is needed to start the ionization. To avoid the necessity of providing a very high voltage source for the contingency that the gas fails to ionize, it is contemplated by this invention to illuminate the cathode surface 42 by a source of illumination 48, 50 or 52.

The sources of illumination, 48, 50 or 52 may be placed in the laser block 10 through apertures 48a, 50a or 52a which may be drilled into the laser block. The block 10, if it is a quartz block, is transparent so that it conducts light from sources 48, 50 or 52 to the surface 42 of the cathode 30. The position of the source 48 is preferred because the entire surface 42 is then illuminated. It has been found that positions 50 or 52, off to the side, may be adequate if enough of the surface 42 is illuminated to initiate ionization. For example, with a preferred embodiment, when seventy percent of the area of the surface 42 is illuminated sufficient photoemission is produced to provide a fast start.

The amount of photoemission depends upon the size of the cathode surface 42, the material of the cathode surface 42 and the intensity and spectrum of the illuminating light reaching the surface 42 from sources 48, 50 or 52. With a typical panel light for a source 48, 50 or 52 and the housing 10 of a transparent material, energizing the tungsten filament of the panel light to a temperature on the order of 2300K is adequate. It should be noted that aluminum oxide is most sensitive in the blue end of the spectrum, and the illumination source preferably has a large amount of blue light for use with such aluminum oxide surface. For a different surface the preferred spectrum would vary. Further, although a transparent material body for transmitting light has been described herein, it is apparent that a translucent material can be used as long as it transmits sufficient intensity of illumination of the proper spectrum to produce emission at the surface 42. Other light spectra such as ultra-violet could be used.

It is important that the source of illumination should be able to be turned off not only to save energy but also to avoid introduction of noise into the laser signals sensed by the photosensors within housings 26, 28. Radioactive material, for example, should not be used because it cannot be turned off, and it can produce noise.

Figure 4:
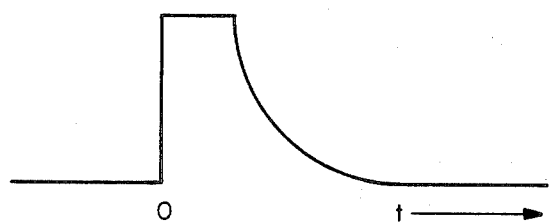
FIG. 4 is a preferred graph of intensity versus time for a typical illumination source in this invention.

The light source 48, 50, 52 is preferably connected into a circuit to cause it to turn on when the anode-cathode voltage is turned on and to turn off after a short illumination flash of on the order of from 400 milliseconds to one second. A preferred plot of such illumination against time is shown in FIG. 4 wherein time zero is the time when the ring laser cathode is first illuminated.

Figure 3:
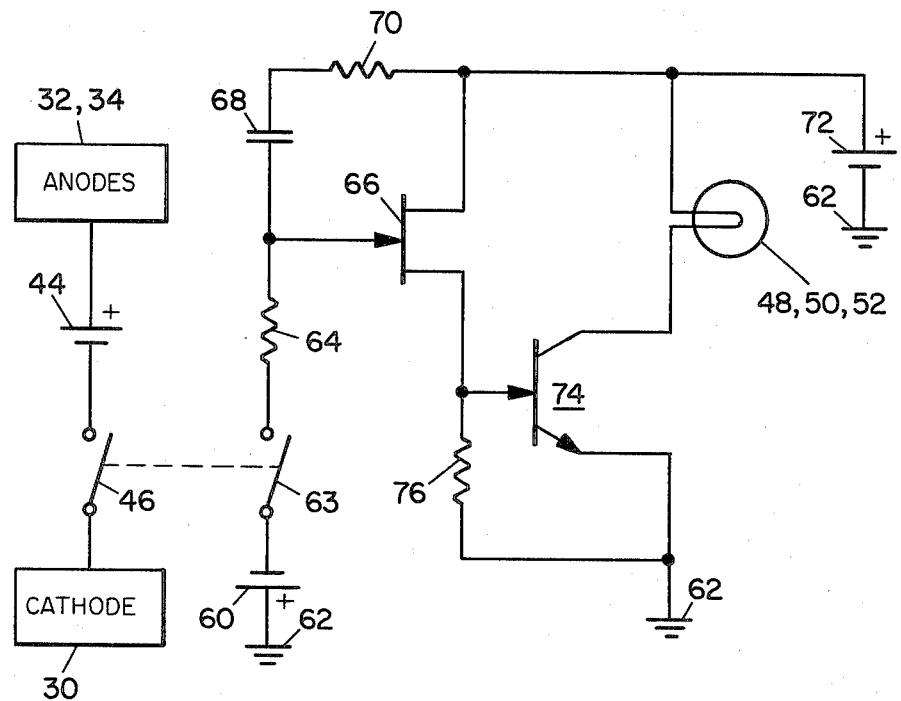
FIG. 3 is a typical circuit for energizing the illumination source of FIGS. 1 and 2.

A circuit which is adequate to control the turning on and off of the illumination source 48, 50 or 52 is shown in FIG. 3. A source of negative voltage 60 is connected between the ground terminal 62 and switch 63. The switch 63 connects source 60 through resistor 64 to the gate electrode of field effect transistor 66 and through capacitor 68 and resistor 70 to a source of positive voltage 72. The source 72 has its negative terminal connected to the ground terminal 62. The base of transistor 74 is connected through resistor 76 to the ground terminal 62 and through the source-drain circuit of field effect transistor 66 to the positive terminal of source 72. The illumation light 48, 50 or 52 is connected, through the collector-emitter path of transistor 74, across the voltage source 72.

When switch 63 closes, the capacitor 68 is initially not energized, and the gate electrode of transistor 66 becomes positive relative to the ground terminal 62 to cause transistor 66 to conduct. The base electrode of transistor 74 becomes positive relative to the ground terminal 62 and conducts to connect the illuminator 48, 50 or 52 into the circuit. The time constant of the circuit is adjusted so that after a predetermined time delay the capacitor 68 is sufficiently charged to stop conduction of transistor 66. The potential on the gate of transistor 66 is then reverse-biased to extinguish the illuminator 48, 50 or 52.

Although the invention has been described with only one cathode for the ring laser, more than one cathode may optionally be used. It is contemplated by this invention that at least one cathode is illuminated but, if desired, all cathodes may be illuminated.

Further, the circuit of FIG. 3 is only an example of an operative circuit for turning the light 48, 50 or 52 on and off. Other known circuits may be used, or the light may be energized by a computer circuit.

It is also important that although the illuminator 48, 50 or 52 is preferably turned off after the start of photoelectric emission from the cathode, it need not be turned off.

Although the invention has been described in detail above, it is not intended that the invention shall be limited by that description but only by that description in combination with the accompanying claims.

I claim:

1. In combination:
   a ring laser, including a resonant cavity enclosing laser gas, at least one cathode and at least one anode attached to said ring laser for energizing gain sections of said ring laser when a voltage is connected between said cathodes and anodes; and
   an illumination source illuminating the surfaces of at least one of said cathodes such that the intensity and spectrum of the illumination is sufficient to produce photoemission from at least one of said cathodes.

2. Apparatus as recited in claim 1 and further comprising control means for synchronizing the turn-on of said voltage source and said illumination means and for turning off said illumination means after a predetermined time.

3. A ring laser comprising:
   a cavity containing laser gas;
   at least three mirrors, including at least one partly reflecting mirror, defining a resonant ring laser path, said path including said cavity;
   at least one cathode and at least one anode;
   gas conduits connecting said cathodes and anodes to different positions in said cavity;
   voltage means connected between said anodes and said cathodes to cause the regions of said cavity between said anodes and cathodes to become laser gain regions;
   apparatus arranged with said partly reflecting mirror to sense counterpropagating laser signals and to produce a signal whose frequency is equal to the difference in frequency between said counterpropagating laser signals; and
   illumination means positioned to illuminate the surfaces of at least on of said cathodes such that the intensity and spectrum of the illumination of said illumination means is sufficient to produce photoemission from said at least one illuminated cathode.

4. A ring laser as recited in claim 3 further comprising control means for synchronizing the turn-on of said voltage source and said illumination means and for turning off said illumination means after a predetermined time.

5. A ring laser comprising:
   a resonant ring cavity containing laser gas;
   at least one cathode and at least one anode;
   voltage means connected between said anodes and said cathodes to cause the regions of said cavity and cathodes to become laser gain regions;
   gas conduits connecting said cathodes and anodes to different positions in said cavity;
   apparatus for extracting information from laser signals in said cavity; and
   illumination means positioned to illuminate the surfaces of at least one of said cathodes, the intensity and spectrum of said illumination being sufficient to produce photoemission from said cathode.

6. Apparatus as recited in claim 5 and further comprising control means for synchronizing the turn-on of said voltage source and said illumination means and for turning off said illumination means after a predetermined time.

7. A ring laser comprising:
   a dimensionally stable laser block having a ring laser cavity containing laser gas, said cavity being substantially a polygonal shape having at least three sides and at least three vertices;
at least three mirrors, equal in number to the number of said vertices and positioned at said vertices to create a resonant ring laser, at least one of said mirrors being only partly reflective;
sensing means positioned at said partly reflective mirror to receive laser signals to produce electrical signals at the frequency of the difference between the frequencies of counterpropagating ring laser beams;
at least one cathode and at least one anode;
conduits connecting said cathodes and anodes to said cavity, whereby voltage connected between said cathodes and anodes produces ion and electron flow in gain regions of said cavity to energize said ring laser; and
illumination means positioned to illuminate the surfaces of at least one of said cathodes, the intensity and spectrum of said illumination being sufficient to produce photoemission from said cathode.

* * * * *